US008171115B2

(12) United States Patent
Hamilton et al.

(10) Patent No.: US 8,171,115 B2
(45) Date of Patent: May 1, 2012

(54) RESOURCE EQUALIZATION FOR INTER- AND INTRA- DATA CENTER OPERATIONS (75) Inventors: James R Hamilton, Bellevue, WA (US); Rebecca A. Norlander, Seattle, WA (US); Michael J Manos, North Bend, WA (US); Feng Zhao, Issaquah, WA (US); David R. Treadwell, III, Seattle, WA (US); Behrooz Chitsaz, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 569 days.

(21) Appl. No.: 12/050,783

(22) Filed: Mar. 18, 2008

(65) Prior Publication Data

US 2009/0240798 A1    Sep. 24, 2009

(51) Int. Cl.
    G06F 15/16    (2006.01)
(52) U.S. Cl. ............ 709/220; 709/208; 709/224; 707/7
(58) Field of Classification Search .................. 709/208, 709/224, 227, 218; 707/9; 370/401
See application file for complete search history.

(56) References Cited

U.S. PATENT DOCUMENTS

| | | | |
|---|---|---|---|
| 5,068,797 A | 11/1991 | Sansone et al. | |
| 6,505,241 B2* | 1/2003 | Pitts | 709/218 |
| 6,854,013 B2 | 2/2005 | Cable et al. | |
| 7,111,061 B2 | 9/2006 | Leighton et al. | |
| 7,152,096 B2 | 12/2006 | Yamamoto et al. | |
| 7,870,153 B2* | 1/2011 | Croft et al. | 707/781 |
| 7,949,677 B2* | 5/2011 | Croft et al. | 707/781 |
| 2002/0194324 A1 | 12/2002 | Guha | |
| 2003/0229697 A1 | 12/2003 | Borella | |
| 2004/0044749 A1* | 3/2004 | Harkin | 709/219 |
| 2004/0117476 A1 | 6/2004 | Steele et al. | |
| 2006/0106922 A1 | 5/2006 | Arregoces et al. | |
| 2006/0107087 A1 | 5/2006 | Sieroka et al. | |
| 2006/0184935 A1* | 8/2006 | Abels et al. | 718/1 |
| 2006/0184936 A1* | 8/2006 | Abels et al. | 718/1 |
| 2006/0193252 A1 | 8/2006 | Naseh et al. | |
| 2006/0271655 A1 | 11/2006 | Yoon et al. | |
| 2007/0171921 A1* | 7/2007 | Wookey et al. | 370/401 |
| 2007/0174410 A1* | 7/2007 | Croft et al. | 709/208 |
| 2007/0179955 A1* | 8/2007 | Croft et al. | 707/9 |
| 2007/0180447 A1* | 8/2007 | Mazzaferri et al. | 718/1 |
| 2007/0180449 A1* | 8/2007 | Croft et al. | 718/1 |
| 2011/0134910 A1* | 6/2011 | Chao-Suren et al. | 370/352 |

OTHER PUBLICATIONS

Chandra, et al., "Dynamic Resource Allocation for Shared Data Centers Using Online Measurements", available at least as early as Oct. 25, 2007, at <<http://www.cs.uwaterloo.ca/~brecht/servers/readings-new/chandra-iwqos-2003.pdf>>, pp. 22.
Santos, et al., "A Mathematical Optimization Approach for Resource Allocation in Large Scale Data Centers", available at least as early as Oct. 25, 2007, at <<http://www.hpl.hp.com/techreports/2002/HPL-2002-64R1.ps>>, pp. 24.

* cited by examiner

*Primary Examiner* — Khanh Dinh
(74) *Attorney, Agent, or Firm* — Lee & Hayes, PLLC (57) ABSTRACT

An exemplary component for managing requests for resources in a data center includes a service request module for receiving requests for resources from a plurality of services and a resource module to monitor resources in a data center and to match received requests to resources. Such a component optionally includes an application programming interface (API) that provides for sending information in response to an API call made by a service. Other methods, devices and systems are also disclosed.

20 Claims, 12 Drawing Sheets

FIG. 1

(PRIOR ART)

RESOURCE EQUALIZATION FOR INTER- AND INTRA- DATA CENTER OPERATIONS

BACKGROUND

Large scale data centers are increasingly used for a wide variety of tasks associated with applications such as electronic mail and Web browsing. For example, software as a service (SaaS) includes Web-based e-mail services (e.g., the MICROSOFT® HOTMAIL® e-mail service) where a vendor typically hosts all of the program logic and data and provides end users with access to this data over the public Internet. Such a service may rely on a distributed application and a large amount of data, which may be stored in more than one data center. A single data center can house thousands of individual storage devices, usually in the form of rack mounted computers, which may be servers. Many now refer to large data centers as "server farms". Resource management is an important aspect of data center operation. Various exemplary techniques are described herein for data center management and operation.

SUMMARY

An exemplary component for managing requests for resources in a data center includes a service request module for receiving requests for resources from a plurality of services and a resource module to monitor resources in a data center and to match received requests to resources. Such a component optionally includes an application programming interface (API) that provides for sending information in response to an API call made by a service. Other methods, devices and systems are also disclosed.

DESCRIPTION OF DRAWINGS

Non-limiting and non-exhaustive examples are described with reference to the following figures.

DETAILED DESCRIPTION

Various exemplary methods, devices and system described herein pertain to monitoring resources in one or more data centers. An exemplary monitoring system is configured to monitor resources associated with one or more data centers and to receive requests for resources. Such a system can utilize resources better for an existing data center or can allow for more effective data center design.

Figure 1:
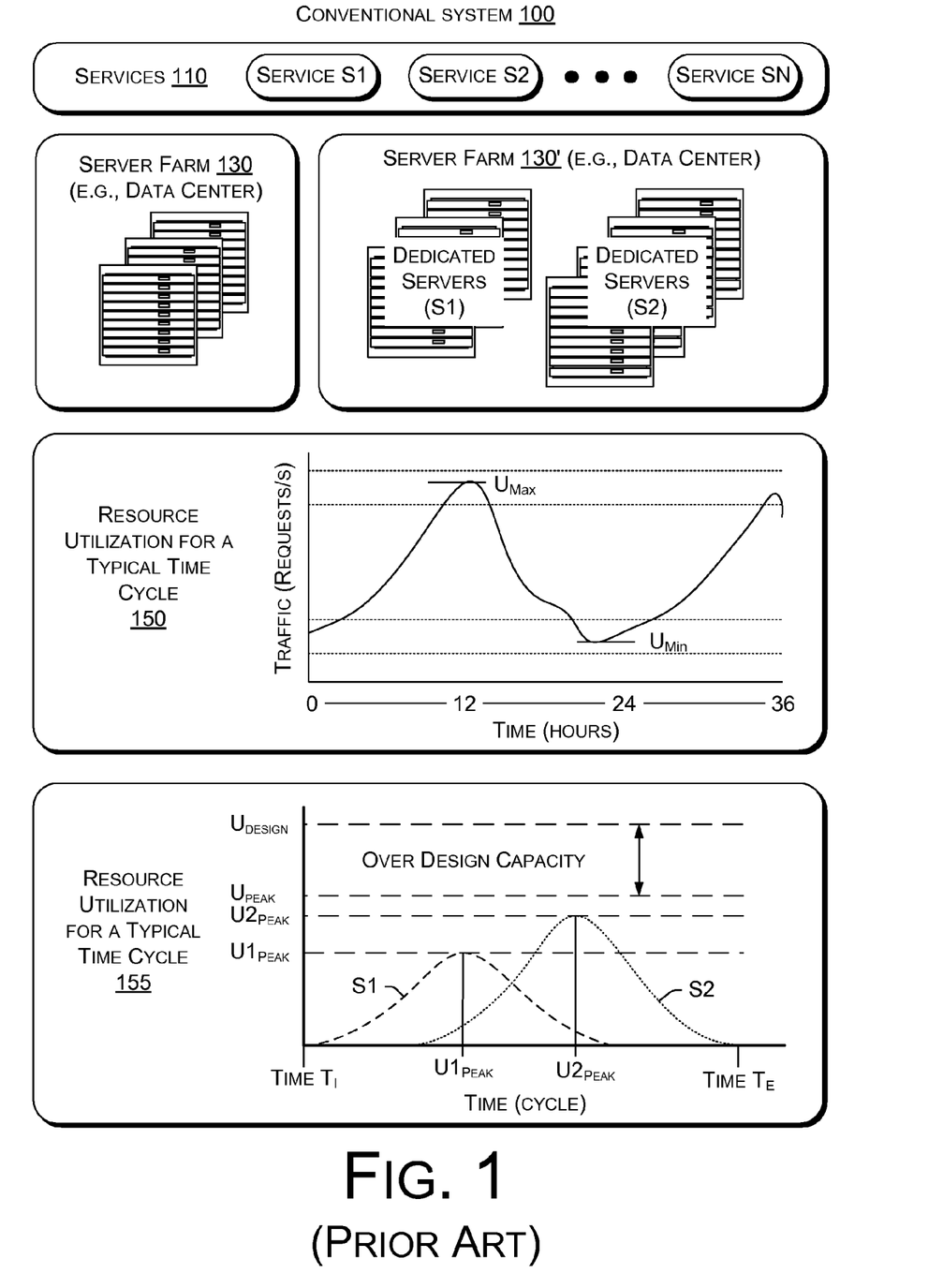
FIG. 1 is a diagram of a conventional system that includes services and dedicated servers in a server farm.

FIG. 1 shows a conventional system 100 that includes one or more services 110 that request resources from a server farm 130 without dedicated servers or a server farm 130' with dedicated servers for particular services (e.g., a dedicated server block S1 provides resources for a first service S1 and a dedicated server block S2 provides resources for a second service S2).

With respect to resource usage, a plot 150 of traffic versus time shows that traffic in requests per second can vary greatly, for example, by a factor of two or more. In this example, the traffic may be for a single service, multiple services, defined resources, etc. Other measures of resource utilization include megabits per second. A selected measure or measures for resource utilization, for purposes of management, may depend on type of service or services operating in a server farm. Often, for particular services, a data center will experience a somewhat regular usage cycle with a maximum usage falling within a maximum usage band (see, e.g., dashed lines) and a minimum usage falling within a minimum usage band (see, e.g., dashed lines).

A plot 155 shows service specific resource utilization versus time (e.g., cycle time, which may be a day or other time) for the service S1 and the service S2, which have utilization or demand peaks $U1_{peak}$ and $U2_{peak}$, respectively. The conventional server farm 130' may be provisioned based on the sum of the utilization peaks. For example, where the server farm 130' handles services S1 and S2, the capacity of server farm 130' is typically based on $U1_{peak}$ plus $U2_{peak}$ or $U_{peak}$(design). However, where these two peaks occur at different times, the server farm 130' is unlikely to ever experience utilization of $U1_{peak}$ plus $U2_{peak}$. Instead, as indicated in the plot 155, an actual utilization peak, $U_{peak}$(actual), is considerably less than $U_{peak}$(design).

As described herein, an exemplary monitoring system can utilize resources better for an existing data center or can allow for more effective data center design, especially where the data center serves multiple services that have different resource utilization patterns with respect to time.

Figure 2:
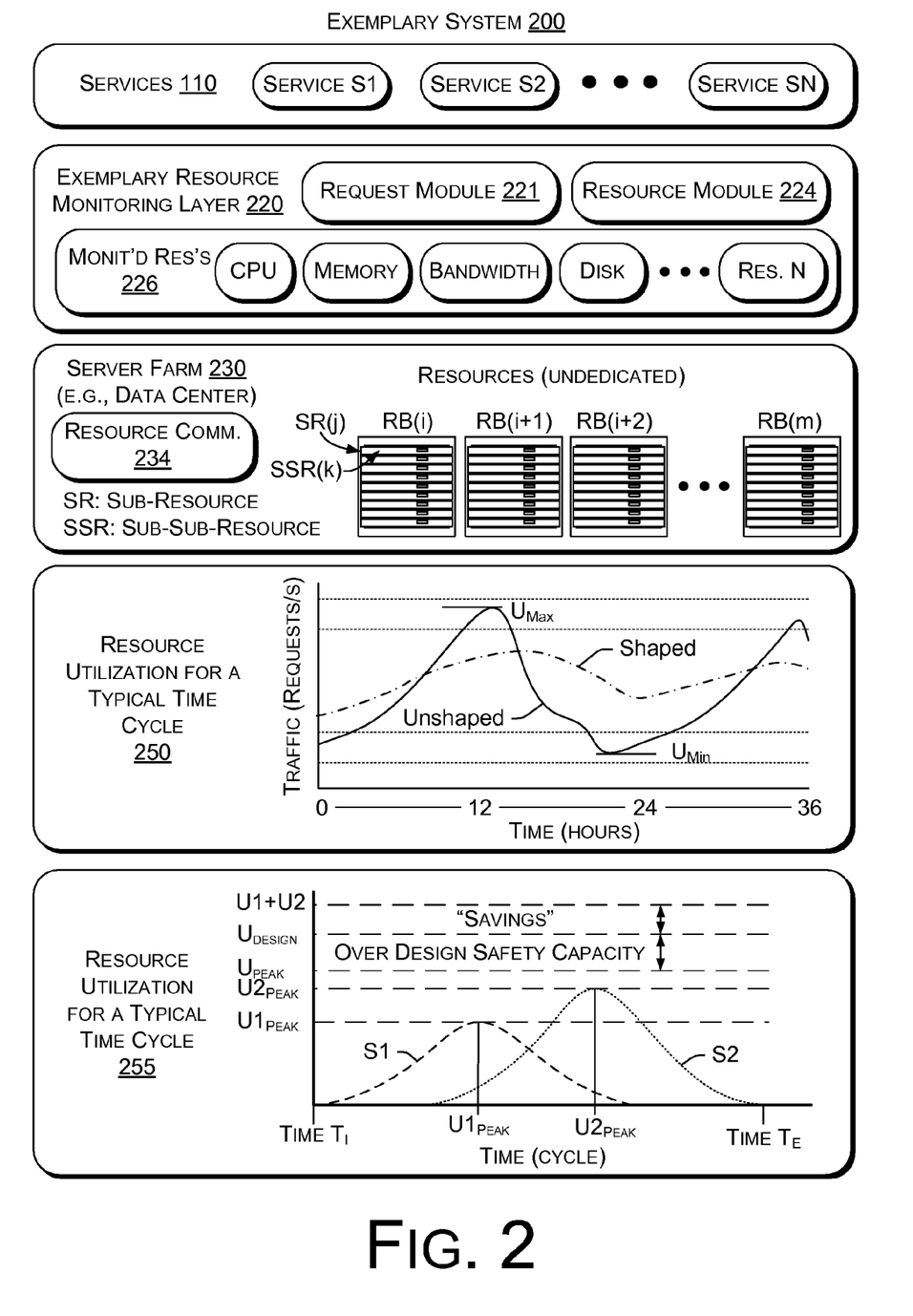
FIG. 2 is a diagram of an exemplary system that includes services, an resource monitoring layer and servers in a server farm.

FIG. 2 shows an exemplary system 200 that includes services 110 that request resources from a server farm 230 via an exemplary resource monitoring layer 220. The server farm 230 includes undedicated resources for various services. For example, a resource block RB(i) includes a sub-resource SR(j), which includes a sub-sub-resource SSR(k). The resources may be processor, memory, bandwidth, disk, I/O, etc., resources.

The resource monitoring layer 220 includes a service request module 221 for receiving requests from services 110 and a resource module 224 for managing resource information, for example, from a set of monitored resources 226 (e.g., processor, memory, bandwidth, disk, I/O, etc., resources).

In the example of FIG. 2, the server farm 230 includes a resource communication module 234 that communicates with the resource monitoring layer 220. The resource communication module 234 can be configured to provide information about resources. For example, each resource block (e.g., RB(i) to RB(m)) can include a resource block address. In such a configuration, the communication module 234 allows the monitoring layer 220 to access one or more individual resource blocks. Once a connection is established, information about one or more resource blocks can be communicated to the monitoring layer 220. Information may be provided as to resources, resource utilization and resource availability. Table 1, below, illustrates addresses and information for resources in a server farm.

TABLE 1

Resource Information

| | RB | | | |
|---|---|---|---|---|
| | RB(1) | RB(2) | RB(3) | RB(4) |
| Address | 10.111.12.0 | 10.111.12.1 | 10.111.12.2 | 10.111.12.3 |
| Bandwidth | 15% utilized | 45% utilized | 5% utilized | 0% utilized |
| SR (Servers) | 25% utilized | 60% utilized | 5% utilized | 0% utilized |
| SSR (CPUs) | 18% utilized | 20% utilized | 2% utilized | 0% utilized |
| SSR (Memory) | 3% utilized | 50% utilized | 2% utilized | 0% utilized |
| SSR (I/O) | 25% utilized | 60% utilized | 2% utilized | 0% utilized |
| SSR (disk) | 2% utilized | 10% utilized | 65% utilized | 0% utilized |

Table 1 includes information organized according to utilization and resource block. Information may be organized in a block specific manner and/or in a server-by-server manner. For example, for a server in RB(1), information may be acquired for CPU, memory, I/O, disk, etc., utilization. In general, available information allows a monitoring layer to manage requests for resources.

The exemplary system 200 can handle requests for resources based in part on resource information. Requests for resources can be processed according to any of a variety of schemes. For example, a first-in-first-out (FIFO) scheme the service request module 221 can maintain a queue that matches resources with requests based on time of receipt of a request. In another example, a requester (e.g., a service) has an associated priority and the service request module 221 can order requests based in part on priority. In such an example, an anti-starvation mechanism may be implemented to ensure that lower priority requests are handled adequately.

For many data centers, resource consumption is cyclical. This has led some operators to bill users on a peak or near peak consumption basis. According to such a billing scheme, a user pays for near-peak consumption even though the user is frequently consuming far below a peak value for the data center. For example, network egress is typically charged at the 95th percentile of peak consumption over a month and yet the real consumption is highly sinusoidal and frequently far below this charged for rate. As described herein, substantial savings can be realized by smoothing resource utilization or resource consumption. For example, the exemplary system 200 can "shape" resource utilization as indicated in a plot 250 of traffic versus time, which shows an unshaped utilization pattern and a shaped utilization pattern where peak demand is clipped and shifted to fill valleys.

As indicated in a plot 255 of utilization versus time, the exemplary system 200 can provide savings with respect to design and/or manage resources more effectively than the conventional system 100 of FIG. 1.

Figure 3:
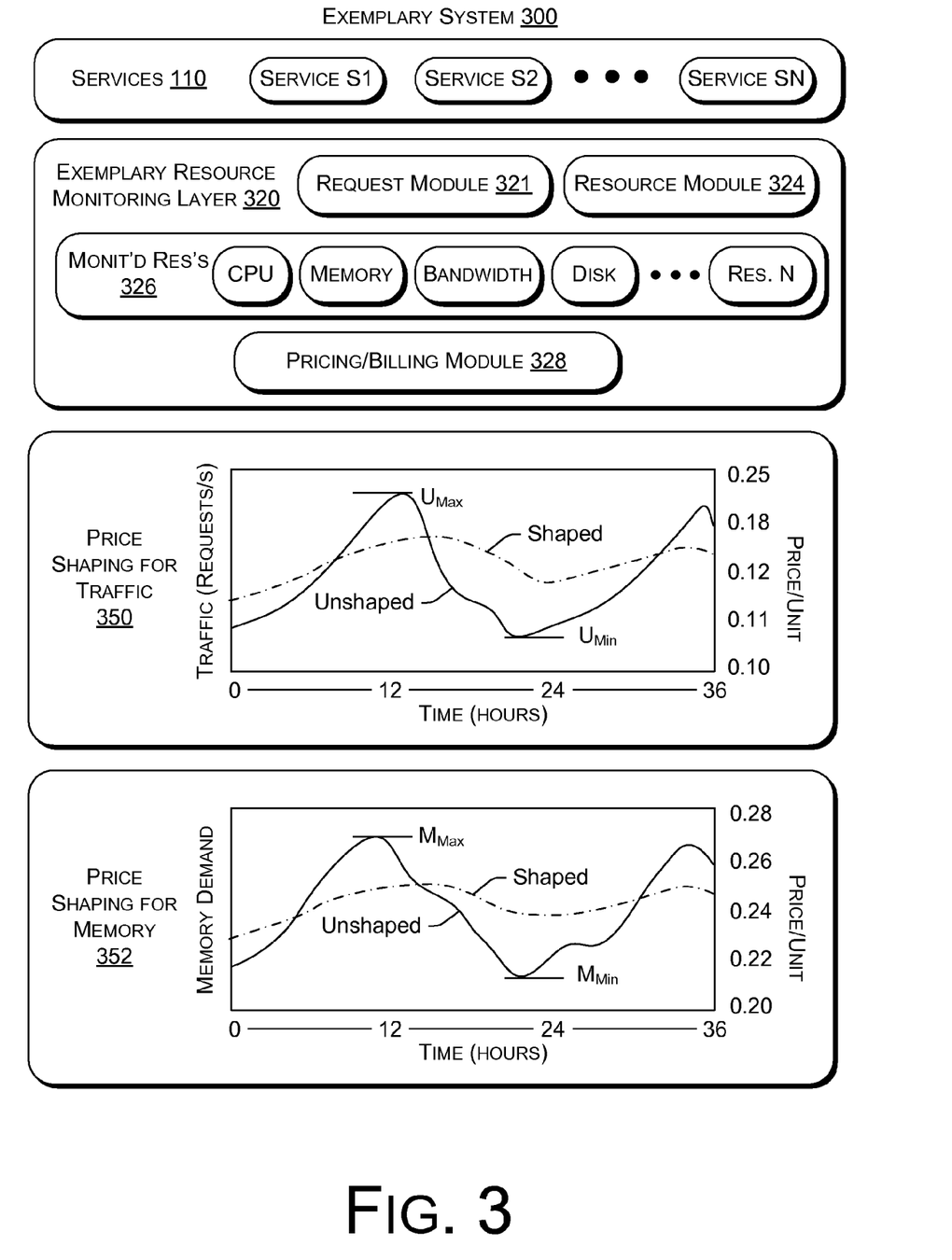
FIG. 3 is a diagram of an exemplary system that includes a price/billing module for resources of a server farm.

FIG. 3 shows an exemplary system 300 that includes one or more services 110 and a resource monitoring layer 320. In this example, the resource monitoring layer 320 includes a request module 321, a resource module 324, monitored resources 326 and a pricing and/or billing module 328 that can determine pricing based at least in part on utilization of monitored resources (e.g., past utilization, current utilization and/or predicted, future utilization).

According to the example of FIG. 3, price may be used as a tool to shape resource utilization. A plot 350 indicates how price per unit may be graded with respect to traffic (e.g., requests per second) to shape traffic with respect to time. A particular price per unit grading is given for purposes of explanation where a non-linear relationship exists between pricing and traffic. Such a grading of price per unit can pressure users into scheduling requests off of peak hours and rescheduling requests into lower priced valleys.

While the plot 350 focuses on traffic, one or more monitored resources may be priced. For example, a plot 352 of memory utilization versus time indicates how memory may be charged on a price per unit utilization basis to shape memory usage in a data center. Such a resource based approach can allow users to schedule or adjust requests to minimize cost, which, in turn, can help shape how resources are utilized.

According to the pricing in the traffic plot 350, a data center operator may charge less for trough bandwidth and more for peak bandwidth. Such a model can be applied to external users and/or internal users (i.e., where a service provider is the data center operator or "owner" of the data center). With respect to internal users, such an approach encourages engineering a service(s) to knock off resource utilization peaks and fill valleys, for example, by deferring non-urgent network load. The same principle applies to external service providers.

In the example of FIG. 3, the pricing/billing module 328 can optionally assess resource utilization for one or more resources over an extended period of time (e.g., 24 hours) and determine a pricing scale that depends on resource utilization and/or that depends on time (e.g., cycle time such as time of day).

As explained with respect to FIGS. 1, 2 and 3, cost is a factor in design and operation of a data center. In a conventional design approach, the number of servers installed is often based on the highest load requirements (e.g., U1+U2 of the plots 155 and 255). By knocking off peaks and filling valleys, less servers are needed. As described herein, such an approach applies also to internal networking. Resource shaping as a technique applies to all resources across the data center. An exemplary resource monitoring layer can account for any varying complexity of scheduling consumption of different resources in a data center or data centers.

As mentioned, egress may be charged at the 95th percentile (i.e., near peak usage). However, ingress and egress for a data center, or data centers, are often purchased symmetrically. Hence, if a user needs to buy N units of egress, then that user will end up buying N units of ingress as well, whether the user needs the ingress or not. Depending on the type of service, these N units of ingress can largely go unused.

An exemplary module for resource management allows for decoupling of ingress and egress purchases. Such an approach can define ingress and egress as two separate resources (optionally with two different billing/pricing arrangements) where each may be shaped accordingly. This approach to cross-dimensional resource shaping can trade off consumption of a "cheap" (or "free") resource to save on an expensive one. Where ingress is essentially free, a technique that trades off ingress to save egress can be economical.

An exemplary module for resource management allows for remote differential compression (RDC) to reduce egress at the expense of a small amount of ingress. Other techniques that waste more ingress in return for egress savings may be implemented to make operation more economical. For example, negotiating and transferring data compression token lookup tables adds a small amount of additional latency in order to spend less egress. Such an approach can be economical and, if the transfers are large, the overall latency might actually improve rather than lengthen.

A cross-dimensional resource-shaping approach can be applied across other dimensions as well. For example, an exemplary method can determine when to add memory to a system to reduce disk and/or network I/O or an exemplary method can determine when it makes sense to use more memory resources to save disk and/or networking resources.

With respect to disk drives, various multi-resource trade-off possibilities exist. When a disk is purchased, the operator is buying both a fixed I/O capability and a fixed disk capacity in a single package. For example, when an operator buys a commodity 750 GB disk, the operator gets a bit less than 750 GB of capacity and the capability of somewhat more than 70 random I/Os per second (IOPS). If a user requests a workload that needs more than 70 I/Os per second, capacity is wasted. If the workload consumes the disk capacity but not the full IOPS capability, then the capacity will be used up but the I/O capability will be wasted. This scenario presents a possibility of variable charging along the lines described above to encourage engineers to consume less of the most valuable resources. For example, a materialized view can be used to trade-off disk capacity for a reduction in the random I/O rate driven by a given workload.

An exemplary method can mix workloads from different services to "absorb" the available resources. Such an approach can account for utilization with respect to time and types of resources utilized by the different services, which may also vary with respect to time. For example, some workloads are I/O bound while others are storage bound (i.e., not I/O bound). An approach can mix these two workloads types to more fully utilize underlying resources. According to a mathematical limit, a management module could call for running a mixed set of workloads with ½ the disk requirements of a workload partitioned configuration. While most workloads are not close to such an extreme limit, savings of around 20 to 30% may be attainable.

Another exemplary approach to managing resources includes sharing excess capacity. Such an approach can pool excess capacity and dynamically assign the excess capacity. Such an approach can safely increase utilization levels on the assumption that not all workloads will peak at the same time. As shown in the plot 155 of FIG. 1, workloads are often not highly correlated in their resource consumption. Consequently, depending on circumstances, this technique can offer even larger savings than achieved through mixing I/O and capacity-bound workloads.

Various approaches described herein can adjust the cost of resources and make services aware of the real second-to-second value of a resource. An exemplary method provides information to a service that, in turn, allows the service to break its resource consumption into defined classes, for example, urgent (expensive), less urgent (somewhat cheaper), and bulk (near free).

Figure 4:
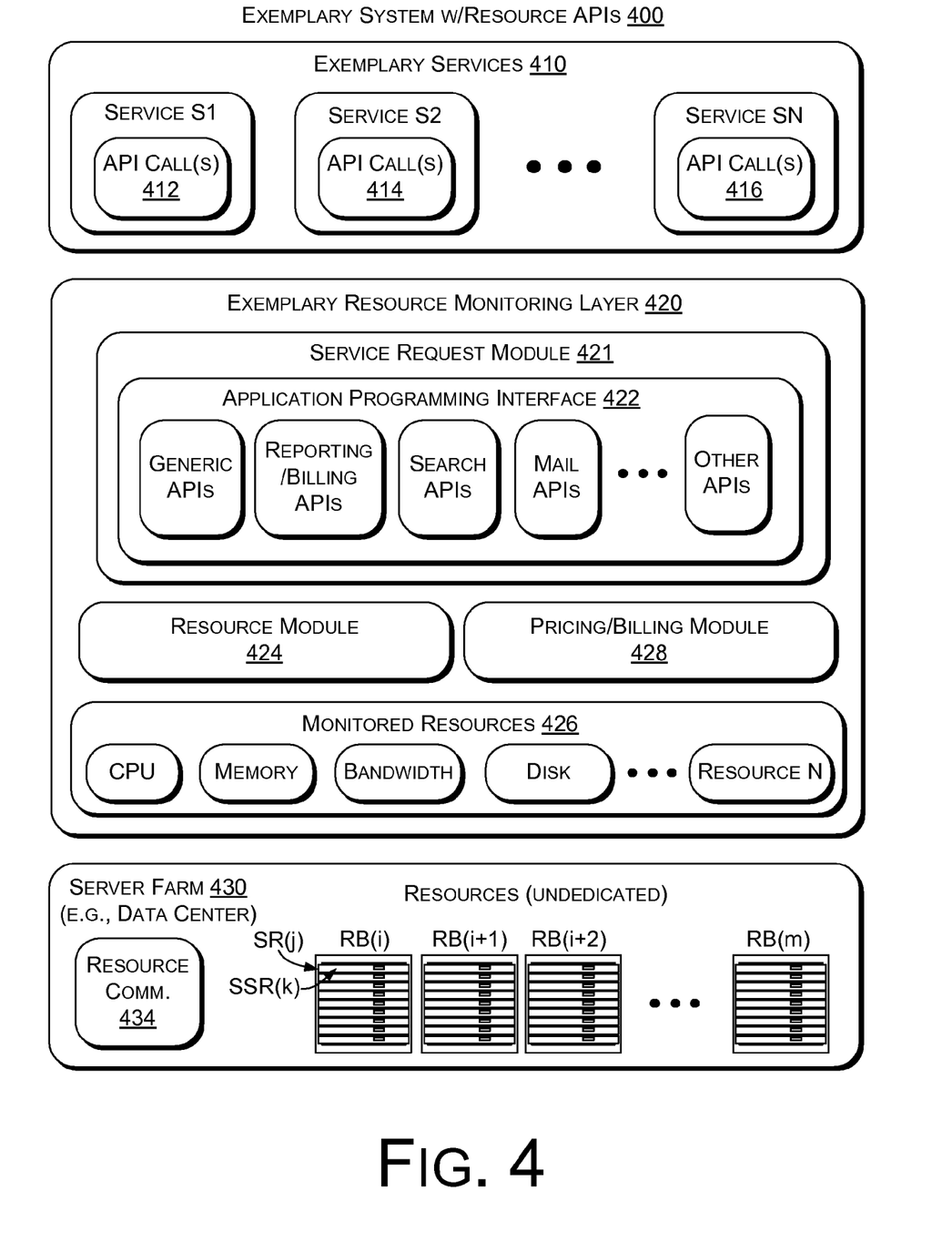
FIG. 4 is a diagram of an exemplary system with resource APIs.

FIG. 4 shows an exemplary system 400 with resource APIs. The system 400 includes exemplary services 410 equipped with API call modules 412 for a service S1, 414 for a service S2 and 416 for a service SN. A resource monitoring layer 420 includes a service request module 421 with an application programming interface 422. The API 422 can provide generic APIs, reporting/billing APIs, search application-related APIs, electronic mail-related APIs and other APIs. The API 422 may include features for any of a variety of applications. Hence, if the service S2 is a search service, then the API calls 414 can call search-related APIs of the API 422, for example, to make a request for resources, to inquire about resource availability, etc.

The resource monitoring layer 420 also includes a resource module 424, a listing of monitored resources 426 and a billing/pricing module 428. Other components of the system 400 include a server farm 430 with a resource communication module 434.

Figure 5:
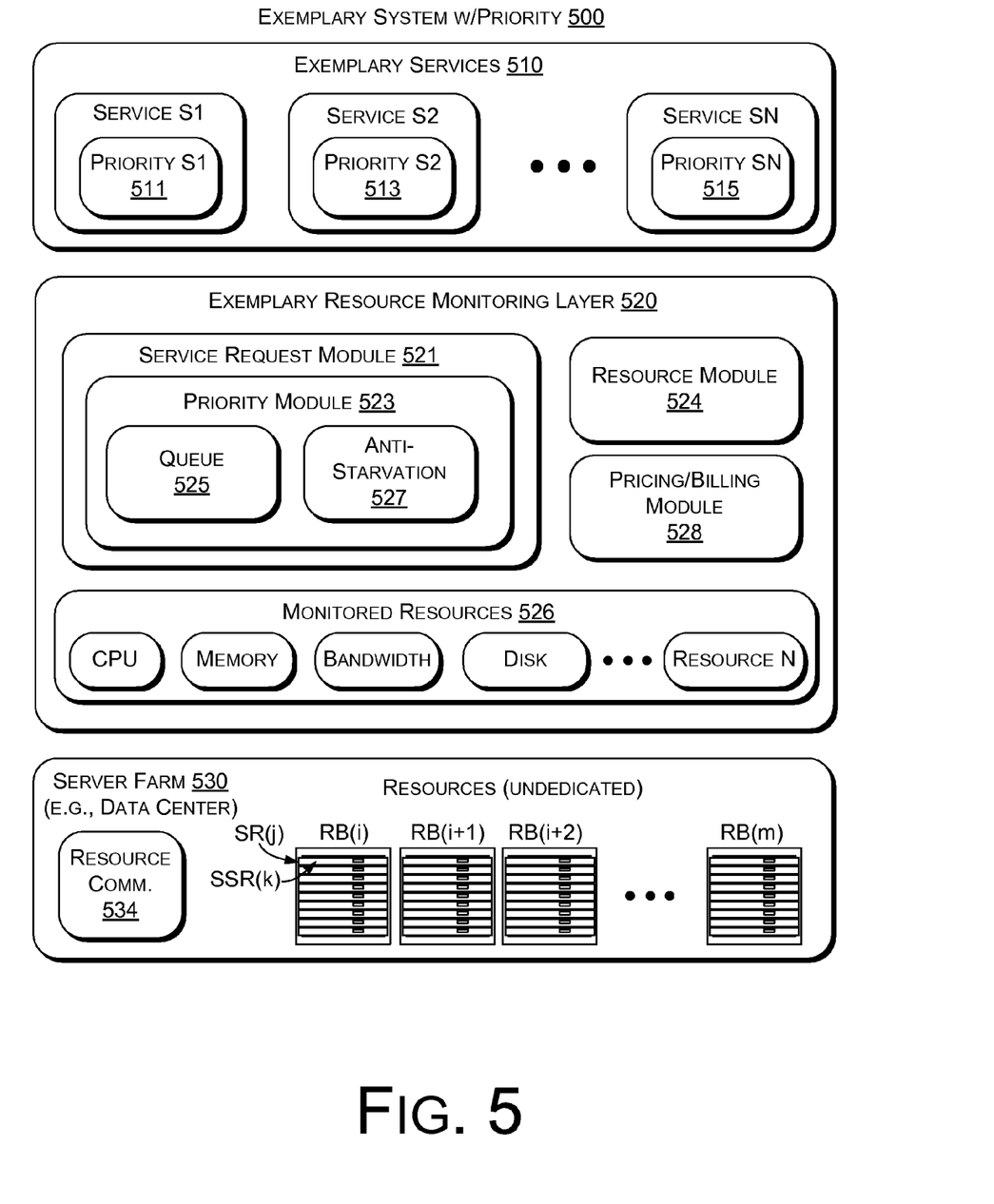
FIG. 5 is a diagram of an exemplary system with service priorities.

FIG. 5 shows an exemplary system 500 with service priorities. The system 500 includes exemplary services 510 having assigned priorities 511 for a service S1, 513 for a service S2 and 515 for a service SN. A resource monitoring layer 520 includes a service request module 521 with a priority management module 523. The priority management module 523 includes a queue 525 and an anti-starvation mechanism 527. Hence, if the assigned priority 513 of service S2 is a low priority service compared to other services, then the priority module 523 places requests from service S2 below those from higher priority services and registers requests from service S2 with the anti-starvation mechanism 527, which may be a timer (e.g., to require service of a request within 24 hours).

The resource monitoring layer 520 also includes a resource module 524, a listing of monitored resources 526 and a pricing/billing module 528. Other components of the system 500 include a server farm 530 with a resource communication module 534.

Figure 6:
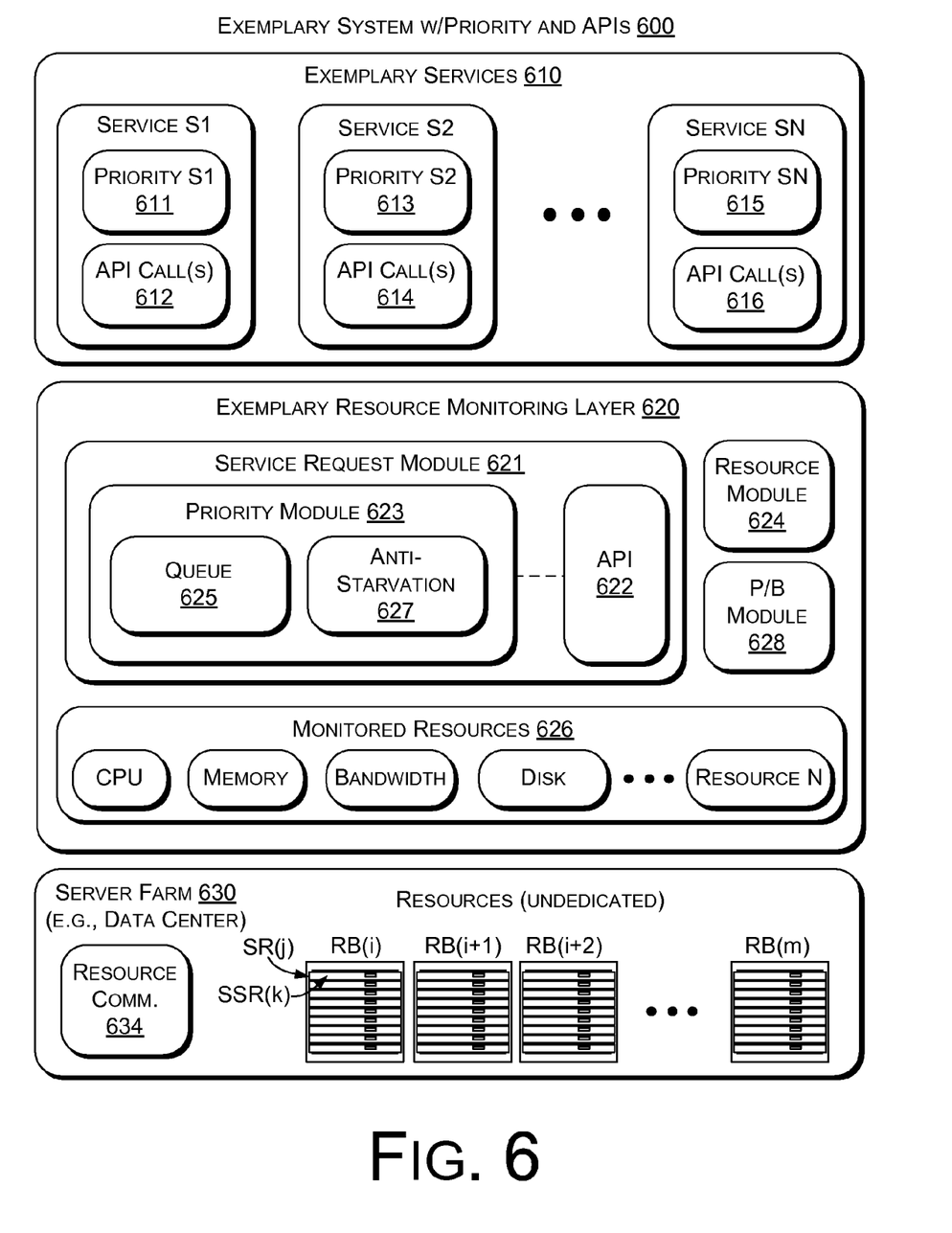
FIG. 6 is a diagram of an exemplary system with resource APIs and service priorities.

FIG. 6 shows an exemplary system 600 with service priorities and an API. The system 600 includes exemplary services 610 equipped with API call modules 612 for a service S1, 614 for a service S2 and 616 for a service SN and with assigned priorities 611 for the service S1, 613 for the service S2 and 615 for the service SN.

A resource monitoring layer 620 includes a service request module 521 with an application programming interface 622 and a priority module 623. The API 622 can provide generic APIs, reporting/billing APIs, search application-related APIs, electronic mail-related APIs and other APIs. The API 622 may include features for any of a variety of applications. Hence, if the service S2 is a search service, then the API calls 614 can call search-related APIs of the API 622, for example, to make a request for resources, to inquire about resource availability, etc.

The resource monitoring layer 620 also includes a resource module 624, a listing of monitored resources 626 and a pricing/billing module 628. Other components of the system 600 include a server farm 630 with a resource communication module 634.

The priority management module 623 includes a queue 625 and an anti-starvation mechanism 627. Hence, if the assigned priority 613 of service S2 is a low priority service compared to other services, then the priority module 623 places requests from service S2 below those from higher priority services and registers requests from service S2 with the anti-starvation mechanism 627, which may be a timer (e.g., to require service of a request within 24 hours).

Figure 7:
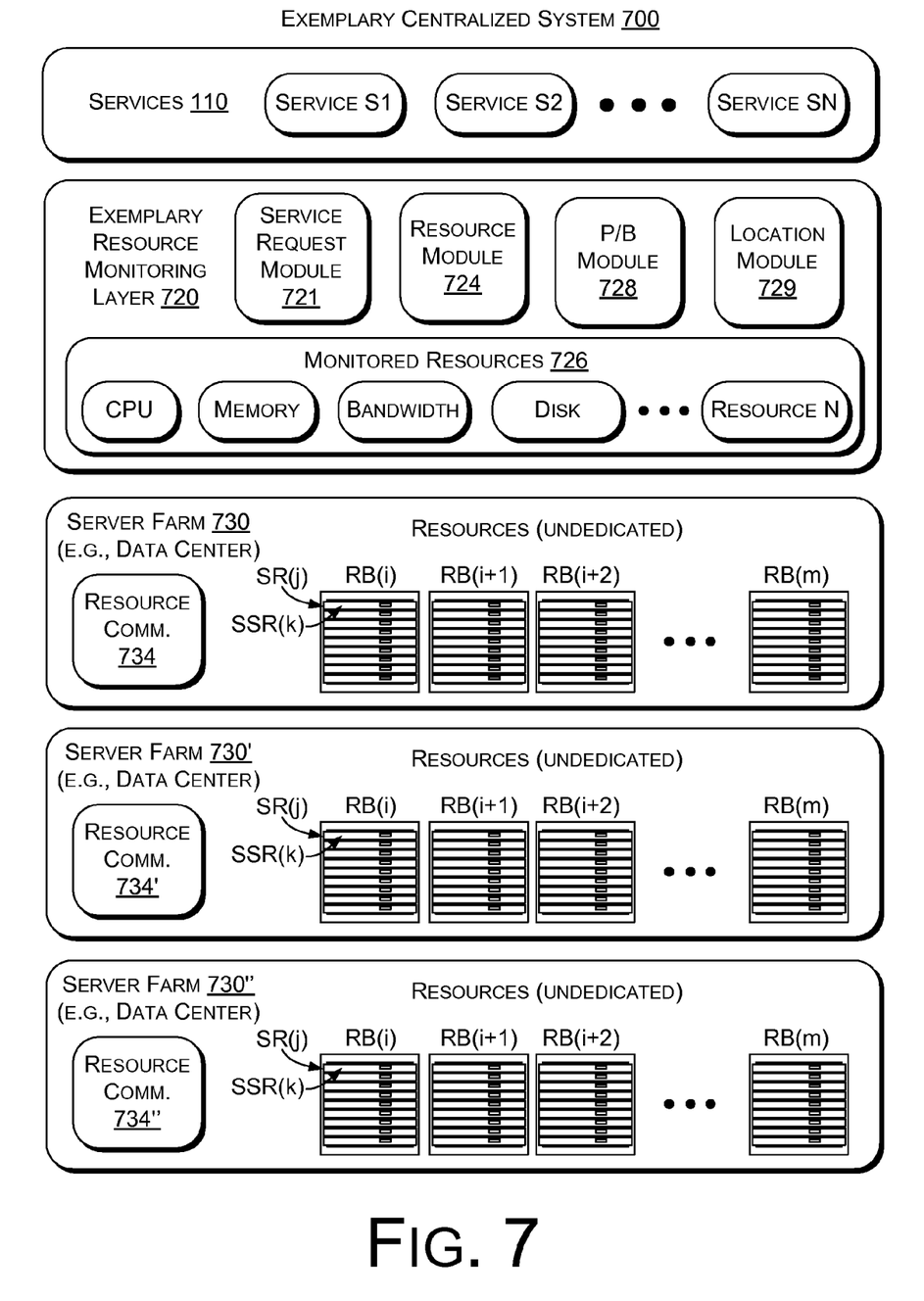
FIG. 7 is a diagram of an exemplary centralized system that includes multiple server farms.

FIG. 7 shows an exemplary centralized system 700 that includes features to monitor resources for more than one server farm. The system 700 includes services 110, a resource monitoring layer 720 and a plurality of server farms 730, 730' and 730" where each server farm includes a respective communication module 734, 734' and 734" for communication with the monitoring layer 720. In this example, the monitoring layer 720 also includes a location module 729 that can provide information germane to location of a server farm. For example, a server farm located in a remote geography with respect to a service requestor may be at a lower level utilization or a lower power cost compared to more proximate server farm. In general, the location module 729 can be used to reduce cost of services and/or to more effectively utilize resources provided by one or more server farms. The resource monitoring layer 720 also includes a resource module 724, a listing of monitored resources 726 and a pricing/billing module 728.

Figure 8:
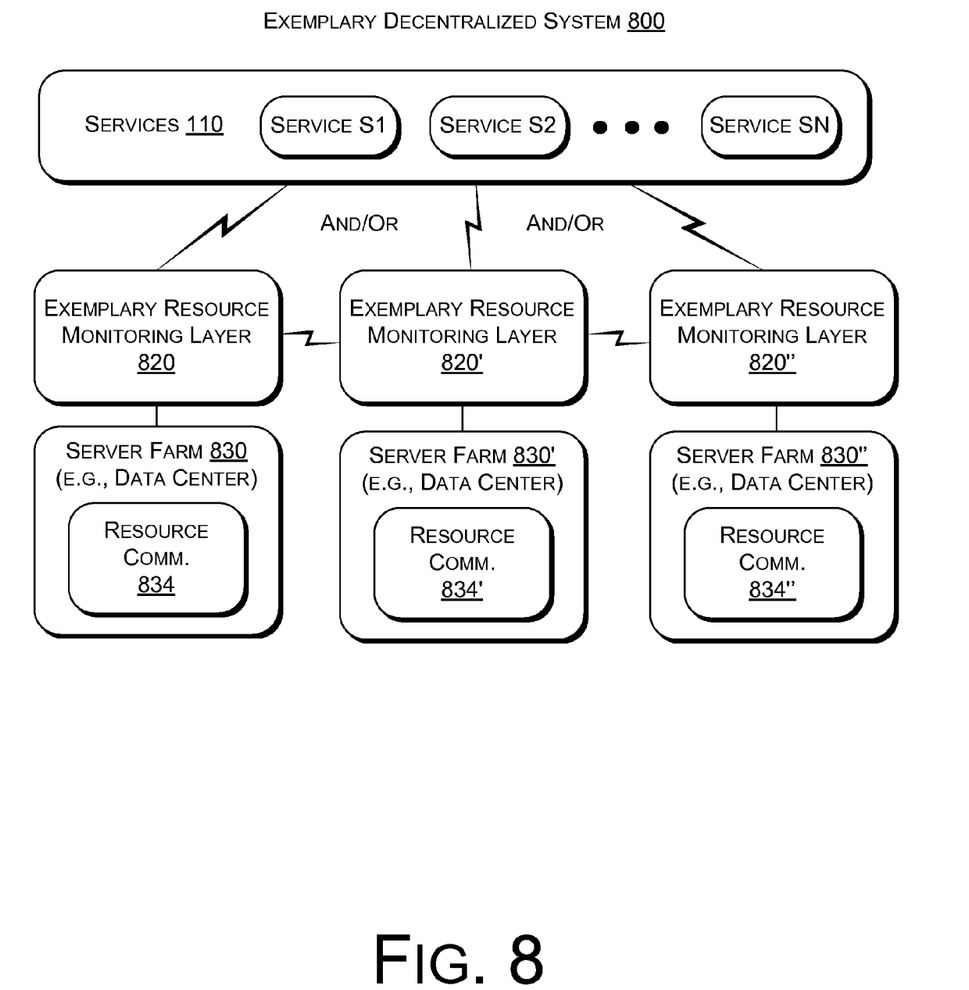
FIG. 8 is a diagram of an exemplary decentralized system that includes multiple server farms.

In contrast to a centralized system, FIG. 8 shows a decentralized system 800. In the decentralized system 800 each of a plurality of server farms 830, 830' and 830" has an associated resource monitoring layer 820, 820' and 820". In the example of FIG. 8, communication links may exist between two or more of the monitoring layers 820, 820' and 820". In such an example, a monitoring layer may refer a request for resources to a monitoring layer associated with a different server farm. In such an example, a service may request resources from a first server farm via a first monitoring layer, receive a response from the first monitoring layer and then decide, based in part on the response, whether to request resources from a different monitoring layer associated with a different server farm.

In the system 800, one of the services 110 may send requests for resources to two or more of the monitoring layers 820, 820' and 820" and then receive responses as to availability and/or cost of resources (e.g., server farm 830, 830' and 830"). In turn, the service may decide which resources to utilize. Such an approach may be implemented in the centralized system 700 of FIG. 7 where a decision may be made by the monitoring layer 720 and/or by one of the services 710.

Figure 9:
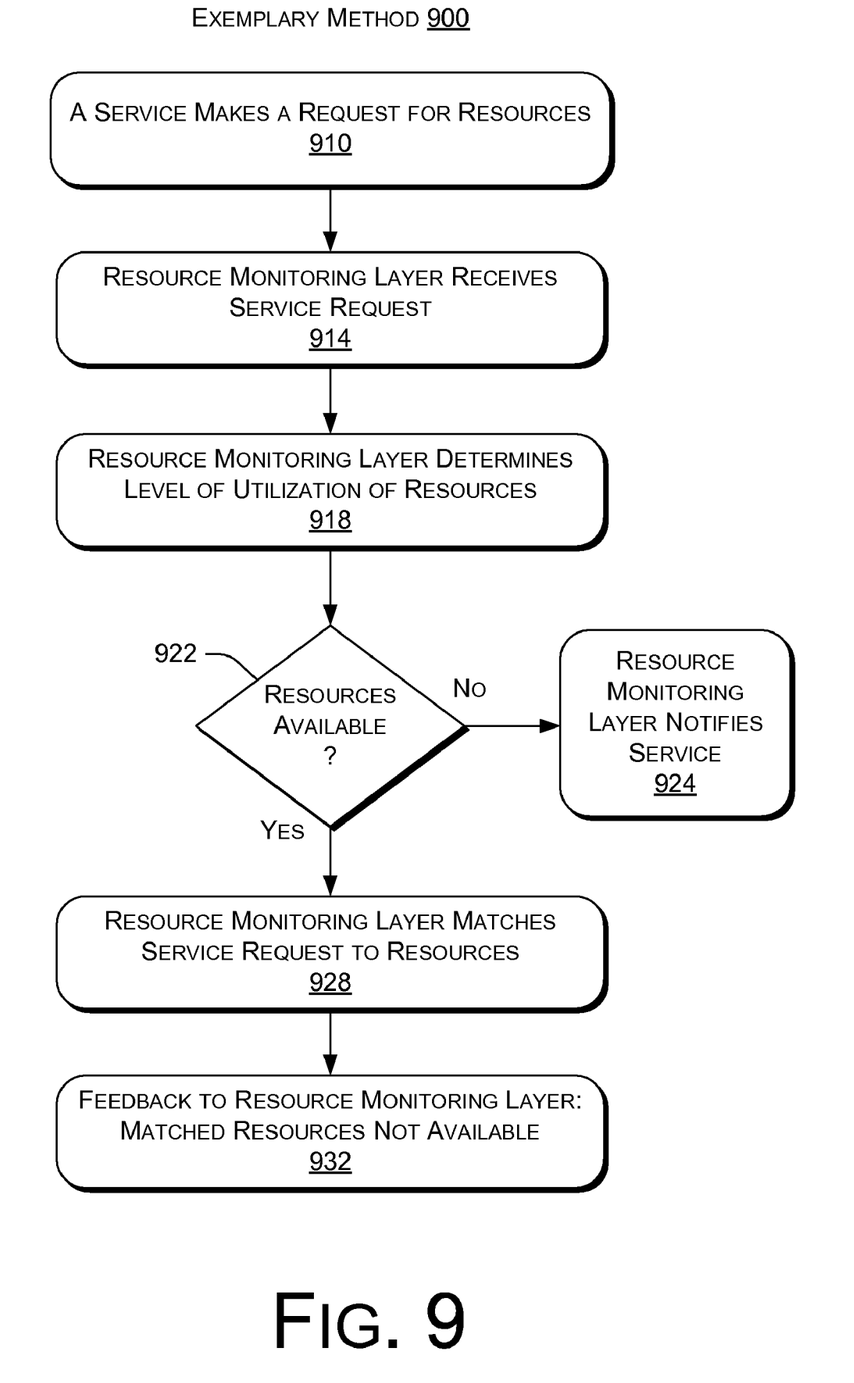
FIG. 9 is a diagram of an exemplary FIFO method that includes monitoring resources.

FIG. 9 shows an exemplary method 900 for a FIFO scheme. The method 900 includes a request block 910 where a service makes a request for resources. A reception block 914 receives the service request for resources, which may be placed in a queue ordered on a FIFO basis. Once the request is processed, a determination block 918 determines a level of utilization of resources. In general, the determination block 918 operates on a continuous basis, however, in an alternative arrangement, the determination block 918 may operate in response to a request.

According to the method 900, based in part on the determination by determination block 918, a decision block 922 decides if the requested resources are available. If the resources are not available, then the method 900 continues in a notification block 924 that notifies the service as to lack of availability. Otherwise, the method 900 continues in a match block 928 that matches the service request to available resources. The method 900 may also provide feedback to a monitoring layer to indicate that the matched resources are not available, for example, until the work responsive to the request has been performed.

Figure 10:
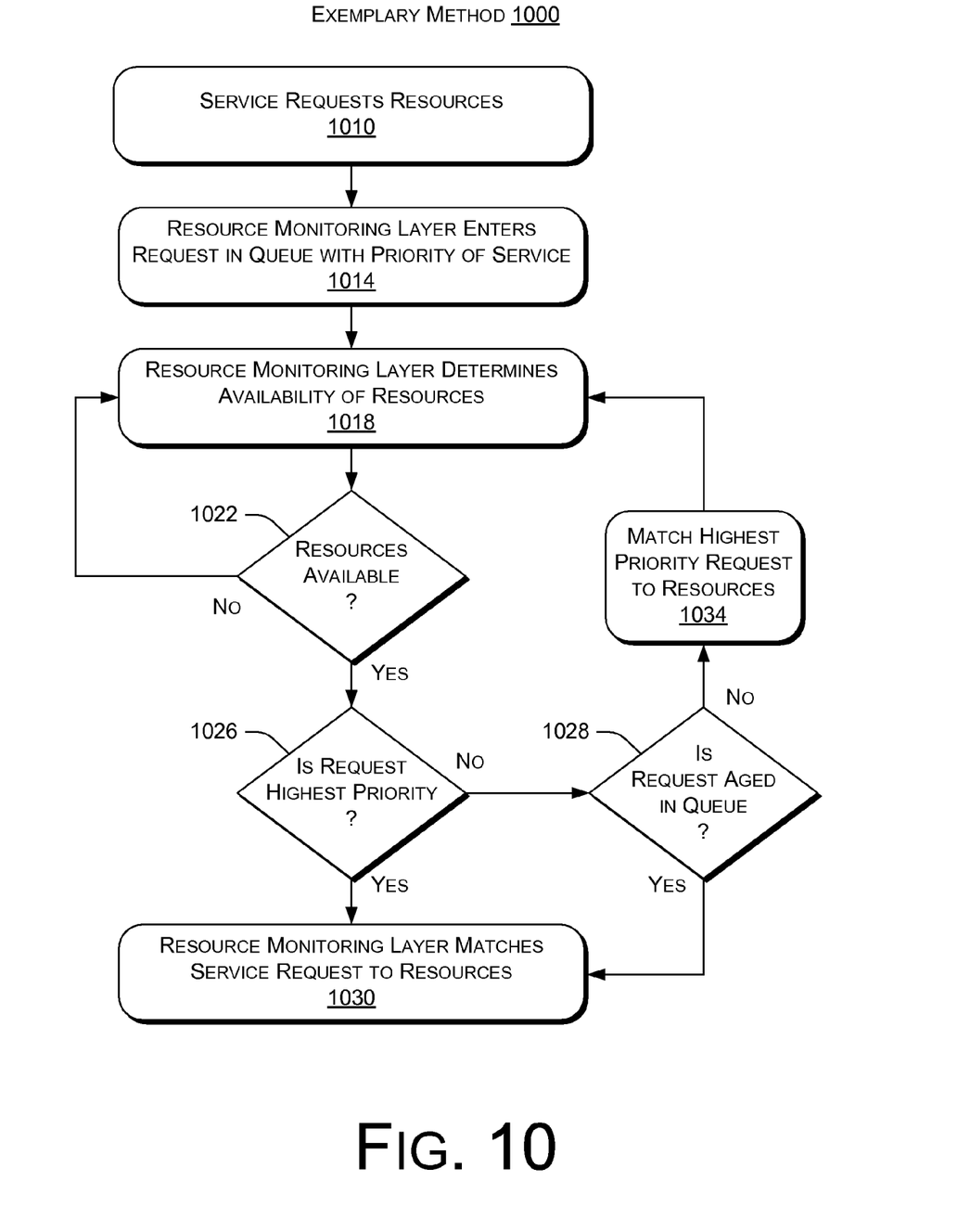
FIG. 10 is a diagram of an exemplary FIFO and priority method that includes monitoring resources.

FIG. 10 shows an exemplary method 1000 that for a priority scheme. The method 1000 includes a request block 1010 where a service makes a request for resources. A reception block 1014 receives the service request for resources and places in a queue ordered on a priority basis. A determination block 1018 determines availability of resources, which may occur on a continuous basis, a scheduled basis or in response to one or more events. A decision block 1022 decides, based in part on the determination, if resources are available. If the decision block 1022 decides that resources are not available, then the method 1000 returns to the determination block 1018. However, if resources are available, then the method 1000 proceeds to another decision block 1026 that decides if the received request per the reception block 1014 is the highest priority. If the request is the highest priority, then a match block 1030 matches the request to available resources.

In the instance that the decision block 1026 decides that the request is not the highest priority, then the method 1000 continues in a decision block 1028 that decides if the request is aged in the queue. Such a decision may be part of an anti-starvation mechanism. If the request is aged, then the method 1000 matches the request to resources per the match block 1030. Otherwise the decision block 1028 enters a match block 1034 that matches the highest priority request to the available resources and the method 1000 continues at the determination block 1018.

Figure 11:
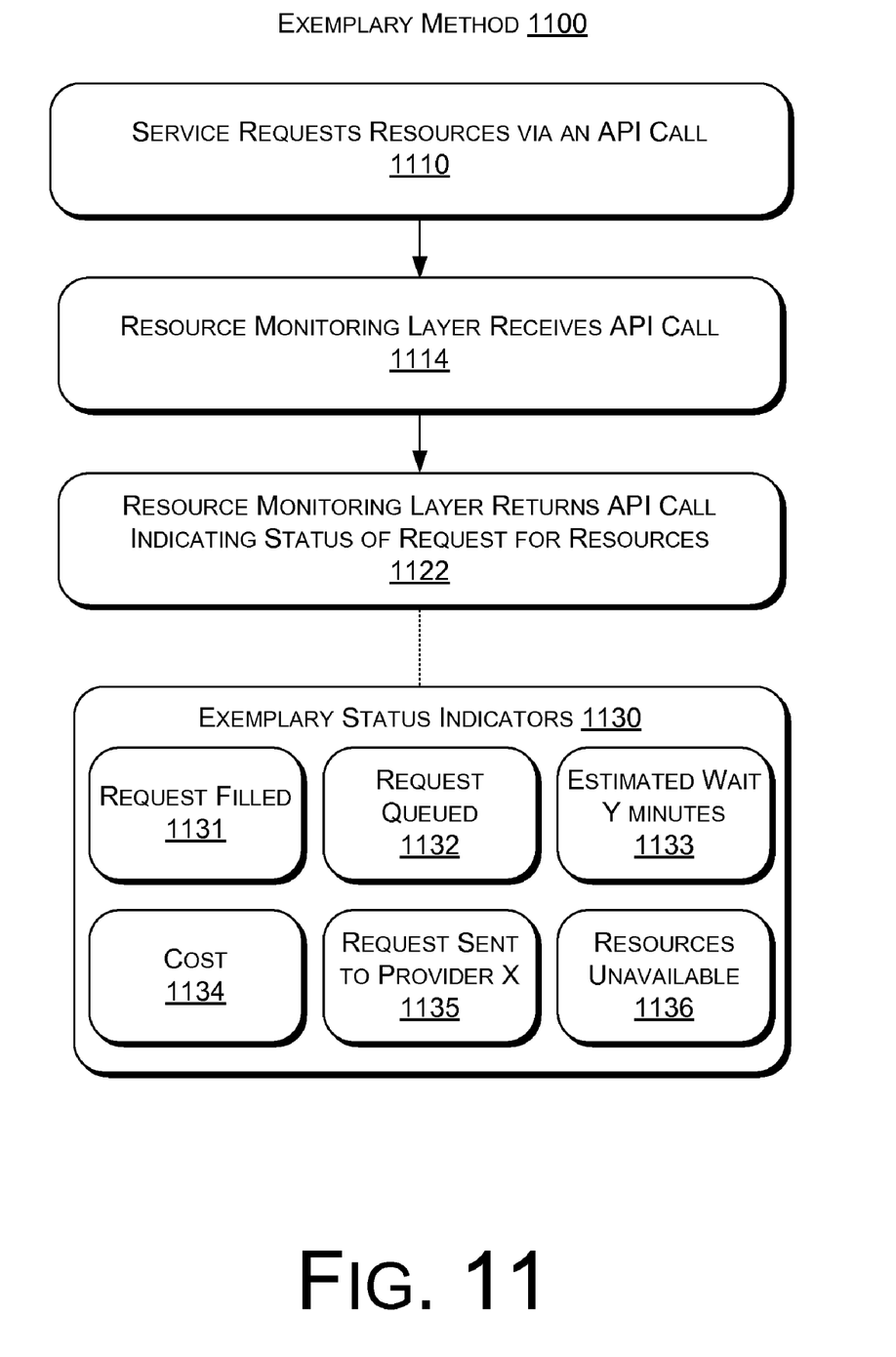
FIG. 11 is a diagram of an exemplary method that includes one or more API calls.

FIG. 11 shows an exemplary method 1100 that includes one or more API calls. In a call block 1110, a service requests resources via an API call. A reception block 1114 receives the API call and performs appropriate action as defined by an API. A return block 1122 returns the API call to the issuing service, for example, indicating status of a request for resources.

In the method 1100, a status indicator may be selected from various exemplary status indicators 1130. For example, a resource monitoring layer may return a request filled indicator 1131, a request queued indicator 1032, an estimated wait time indicator 1133, a cost indicator 1134, a request routing indicator 1135 and/or a resources unavailable indicator 1136. The cost indicator 1134 may be based on pricing/billing information determined by a pricing/billing module such as the module 238 of FIG. 2.

An exemplary method can manage bandwidth associated with a data center. For example, a data center may have, depending on workload, egress/ingress bandwidth asymmetry. An exemplary method can monitor resources, including bandwidth, receiving requests and match requests with resources in a manner that balances egress/ingress to reduce asymmetry. An exemplary system can include a monitoring layer with a resource module that acts to balance egress/ingress for one or more data centers.

Figure 12:
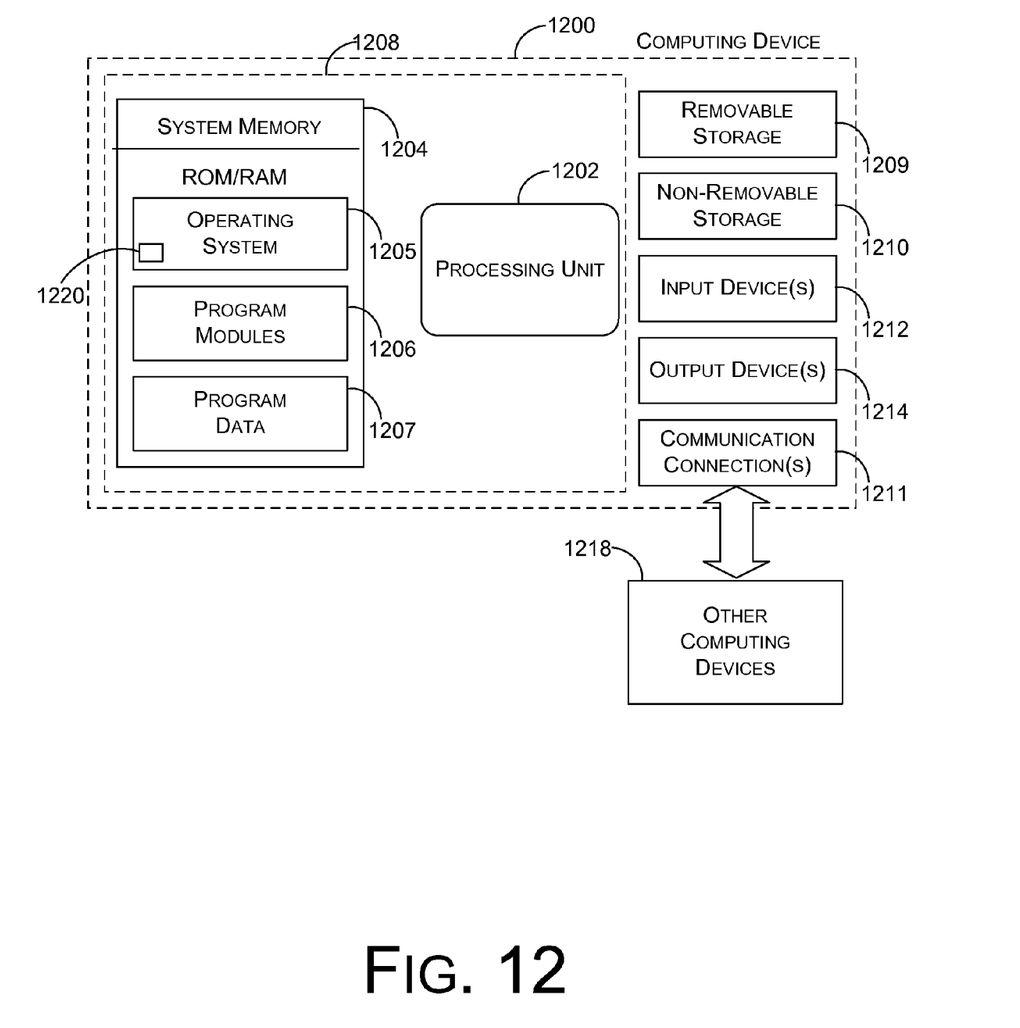
FIG. 12 is a block diagram of an exemplary computing device.

FIG. 12 illustrates an exemplary computing device 1200 that may be used to implement various exemplary components and in forming an exemplary system. For example, the servers of the system of FIG. 1 may include various features of the device 1100.

In a very basic configuration, computing device 1200 typically includes at least one processing unit 1202 and system memory 1204. Depending on the exact configuration and type of computing device, system memory 1204 may be volatile (such as RAM), non-volatile (such as ROM, flash memory, etc.) or some combination of the two. System memory 1204 typically includes an operating system 1205, one or more program modules 1206, and may include program data 1207. The operating system 1205 include a component-based framework 1220 that supports components (including properties and events), objects, inheritance, polymorphism, reflection, and provides an object-oriented component-based application programming interface (API), such as that of the .NET™ Framework available from Microsoft Corporation, Redmond, Wash. The device 1200 is of a very basic configuration demarcated by a dashed line 1208. Again, a terminal may have fewer components but will interact with a computing device that may have such a basic configuration.

Computing device 1200 may have additional features or functionality. For example, computing device 1200 may also include additional data storage devices (removable and/or non-removable) such as, for example, magnetic disks, optical disks, or tape. Such additional storage is illustrated in FIG. 12 by removable storage 1209 and non-removable storage 1210. Computer storage media may include volatile and nonvolatile, removable and non-removable media implemented in any method or technology for storage of information, such as computer readable instructions, data structures, program modules, or other data. System memory 1204, removable storage 1209 and non-removable storage 1210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1200. Any such computer storage media may be part of device 1200. Computing device 1200 may also have input device(s) 1212 such as keyboard, mouse, pen, voice input device, touch input device, etc. Output device(s) 1214 such as a display, speakers, printer, etc. may also be included. These devices are well known in the art and need not be discussed at length here.

Computing device 1200 may also contain communication connections 1216 that allow the device to communicate with other computing devices 1218, such as over a network. Communication connections 1216 are one example of communication media. Communication media may typically be embodied by computer readable instructions, data structures, program modules, or other data forms. By way of example, and not limitation, communication media includes wired media such as a wired network or direct-wired connection, and wireless media such as acoustic, RF, infrared and other wireless media. The term computer readable media as used herein includes both storage media and communication media.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method performed by one or more processing units configured with computer readable instructions, the method comprising:
    receiving requests for resources from a plurality of services, the plurality of services comprising asynchronous peak demands;
    monitoring resources in a data center;
    matching received requests to the resources; and
    determining a pricing based at least in part on utilization of the monitored resources that prompts a user to schedule at least one of the requests at a time of off-peak demands and reschedule the at least one of the requests at a time with valley demands, the pricing including different pricing for ingress and egress for the data center.

2. The method of claim 1 wherein the monitoring comprises monitoring utilization of resources in the data center.

3. The method of claim 1 wherein the monitoring comprises monitoring one or more resources selected from a group consisting of processor resources, memory resources, bandwidth resources, I/O resources and disk resources.

4. The method of claim 1 wherein the matching comprising matching the received requests to the resources based on a first-in-first-out scheme.

5. The method of claim 1 wherein the matching comprises matching the received requests to the resources based on a service associated priority scheme.

6. The method of claim 5 wherein the matching comprises using an anti-starvation mechanism.

7. The method of claim 1 further comprising providing an application programming interface (API).

8. The method of claim 7 wherein the API provides for sending information in response to an API call.

9. The method of claim 8 wherein the information comprises cost information associated with cost of resources required to service a request.

10. The method of claim 9 wherein the cost information comprises cost based in part on utilization of resources in the data center.

11. One or more memories having stored therein one or more computer executable modules that are executable by one or more processors, the one or more computer executable modules comprising:
    a service request module that receives requests for resources from a plurality of services;
    a resource module that monitors resources in one or more data centers and matches the received requests to the resources;
    a geographic location module that maintains a geographic location for each of the plurality of data centers; and
    a pricing module that determines a pricing based at least in part on utilization of the monitored resources that prompts a user to schedule at least one of the requests at a time of off-peak demands and reschedule the at least one of the requests at a time with valley demands, the pricing including different pricing for ingress and egress for at least one of the one or more data centers.

12. The one or more memories of claim 11, wherein the resource module matches the requests to the resources based in part on geographic location.

13. The one or more memories of claim 12, wherein the resource module matches the requests to the resources based in part on the geographic location, a resource utilization, and a power cost of one or more of the plurality of data centers.

14. The one or more memories of claim 11 wherein the service request module comprises an application programming interface (API).

15. The one or more memories of claim 14 wherein the API provides for sending information in response to an API call.

16. The one or more memories of claim 15 wherein the information comprises cost information associated with cost of resources required to service a request.

17. The one or more memories of claim 11 wherein the resource module matches the requests to the resources based in part on cost of resources.

18. A system for managing requests for resources in a plurality of data centers, the system comprising:
    one or more processors; and
    one or more memories having stored thereon computer executable modules that are executable by the one or more processors, the one or more computer executable modules comprising:
        a service request module that receives requests for resources from a plurality of services;
        a priority management module that places the requests according to their priorities;
        a geographic location module that maintains a geographic location for each of the plurality of data centers;
        a resource module that monitors resources in a data center, communicates with another resource module that monitors resources in another data center and matches the received requests to resources in one or more data centers of the plurality of data centers based in part on the geographic location, the pricing of resource utilization, or a power cost of the one or more data centers of the plurality of data centers; and
        a pricing module that determines a pricing based at least in part on utilization of the monitored resources that prompts a user to schedule at least one of the requests at a time of off-peak demands and reschedule the at least one of the requests at a time with valley demands, the pricing including different pricing for ingress and egress for the one or more data centers of the plurality of data centers.

19. The system of claim 18, wherein the resource module determines when to use more memory resources to save disk and/or networking resources.

20. The method of claim 1 further comprising assessing a resource utilization for one or more of the resources over a period of time and determines a pricing scale of the one or more of the resources based on the resource utilization.

* * * * *

UNITED STATES PATENT AND TRADEMARK OFFICE
CERTIFICATE OF CORRECTION

| | | |
|---|---|---|
| PATENT NO. | : 8,171,115 B2 | Page 1 of 1 |
| APPLICATION NO. | : 12/050783 | |
| DATED | : May 1, 2012 | |
| INVENTOR(S) | : James R. Hamilton et al. | |

It is certified that error appears in the above-identified patent and that said Letters Patent is hereby corrected as shown below:

In column 10, line 27, in Claim 12, after "on" insert -- the --.

Signed and Sealed this
Twenty-sixth Day of June, 2012

David J. Kappos
*Director of the United States Patent and Trademark Office*